(12) United States Patent
Sumcad et al.

(10) Patent No.: US 11,263,575 B2
(45) Date of Patent: Mar. 1, 2022

(54) INTEGRATION OF METRIC COLLECTION WITH VEHICLE REQUEST FULFILLMENT

(71) Applicant: GM Global Technology Operations LLC, Detroit, MI (US)

(72) Inventors: Anthony J. Sumcad, Troy, MI (US); Anil Kumar Nichenametla, Canton, MI (US); Amar Badal, Rochester Hills, MI (US); Ravikiran Dhullipala Chenchu, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 245 days.

(21) Appl. No.: 16/522,319

(22) Filed: Jul. 25, 2019

(65) Prior Publication Data

US 2021/0027230 A1    Jan. 28, 2021

(51) Int. Cl.
*G06Q 10/06* (2012.01)
*G06N 20/00* (2019.01)

(52) U.S. Cl.
CPC ....... *G06Q 10/06393* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 8,682,804 | B1* | 3/2014 | Yoon | G06Q 30/0645 705/307 |
| 8,866,638 | B2* | 10/2014 | Weigert | G08G 1/0141 340/934 |
| 2013/0321178 | A1* | 12/2013 | Jameel | H04W 4/029 340/989 |
| 2018/0091930 | A1* | 3/2018 | Jefferies | H04L 63/08 |
| 2018/0276571 | A1* | 9/2018 | Poddar | G06Q 10/02 |
| 2018/0315146 | A1* | 11/2018 | Matthiesen | G06Q 10/06315 |

* cited by examiner

*Primary Examiner* — Eric W Stamber
*Assistant Examiner* — Ashley Y Young
(74) *Attorney, Agent, or Firm* — Cantor Colburn LLP

(57) ABSTRACT

A system and method to integrate metric collection with vehicle request fulfillment include obtaining a vehicle request from a vehicle requestor, the vehicle request including one or more vehicle criteria, and obtaining a data request from a data requestor, the data request including one or more data criteria corresponding with vehicle metrics. The method includes suggesting to the vehicle requestor one or more suggested vehicles from a fleet of vehicles based on their match with the one or more vehicle criteria and the one or more data criteria. The method also includes obtaining the vehicle metrics based on usage of one of the one or more suggested vehicles by the vehicle requestor, and providing the vehicle metrics to the data requestor.

16 Claims, 3 Drawing Sheets

INTEGRATION OF METRIC COLLECTION WITH VEHICLE REQUEST FULFILLMENT

The subject disclosure relates to the integration of metric collection with vehicle request fulfillment.

In various scenarios, a person may request a vehicle for use. The vehicle may or may not be an autonomous vehicle or may include aspects of autonomous operation (e.g., collision avoidance, adaptive cruise control, automatic braking). For example, an employee may request a vehicle from a company fleet, a customer of a dealer service center may request a loaner vehicle, or a customer of a rental car company may request a rental car. In each of these scenarios, the requestor may specify characteristics or features for the vehicle being requested. The vehicle provider or other party may be interested in obtaining metrics about certain features or functionalities. Accordingly, it is desirable to provide integration of metric collection with vehicle request fulfillment.

SUMMARY

In one exemplary embodiment, a method of integrating metric collection with vehicle request fulfillment includes obtaining a vehicle request from a vehicle requestor, the vehicle request including one or more vehicle criteria, and obtaining a data request from a data requestor, the data request including one or more data criteria corresponding with vehicle metrics. The method also includes suggesting, to the vehicle requestor, one or more suggested vehicles from a fleet of vehicles based on their match with the one or more vehicle criteria and the one or more data criteria. The vehicle metrics are obtained based on usage of one of the one or more suggested vehicles by the vehicle requestor, and the vehicle metrics are provided to the data requestor.

In addition to one or more of the features described herein, the one or more vehicle criteria includes a type or feature.

In addition to one or more of the features described herein, the one or more vehicle criteria additionally includes a trip type or a time of day of travel.

In addition to one or more of the features described herein, the one or more vehicle criteria additionally includes a trade-in vehicle.

In addition to one or more of the features described herein, the one or more data criteria includes a vehicle feature.

In addition to one or more of the features described herein, the one or more data criteria additionally includes a trip type, a geography of travel, or a time of day of travel.

In addition to one or more of the features described herein, the vehicle metrics include automatically recorded metrics from the one of the one or more suggested vehicles and manually recorded metrics from the vehicle requestor.

In addition to one or more of the features described herein, the suggesting the one or more suggested vehicles includes implementing machine learning to match the one or more vehicle criteria and the one or more data criteria with available vehicles in the fleet of vehicles.

In addition to one or more of the features described herein, the method also includes obtaining a response from the vehicle requestor to the one or more suggested vehicles as feedback to the machine learning.

In addition to one or more of the features described herein, the providing the vehicle metrics includes combining the vehicle metrics from two or more of the one of the one or more suggested vehicles respectively suggested to two or more of the vehicle requestors.

In another exemplary embodiment, a system to integrate metric collection with vehicle request fulfillment includes a memory device to store a database of available vehicles. The system also includes a processor to obtain a vehicle request from a vehicle requestor, the vehicle request including one or more vehicle criteria, and to obtain a data request from a data requestor, the data request including one or more data criteria corresponding with vehicle metrics. The processor also suggests to the vehicle requestor one or more suggested vehicles from a fleet of vehicles based on their match with the one or more vehicle criteria and the one or more data criteria, obtains the vehicle metrics based on usage of one of the one or more suggested vehicles by the vehicle requestor, and provides to the data requestor the vehicle metrics.

In addition to one or more of the features described herein, the one or more vehicle criteria includes a type or feature.

In addition to one or more of the features described herein, the one or more vehicle criteria additionally includes a trip type or a time of day of travel.

In addition to one or more of the features described herein, the one or more vehicle criteria additionally includes a trade-in vehicle.

In addition to one or more of the features described herein, the one or more data criteria includes a vehicle feature.

In addition to one or more of the features described herein, the one or more data criteria additionally includes a trip type, a geography of travel, or a time of day of travel.

In addition to one or more of the features described herein, the vehicle metrics include automatically recorded metrics from the one of the one or more suggested vehicles and manually recorded metrics from the vehicle requestor.

In addition to one or more of the features described herein, the processor implements machine learning to match the one or more vehicle criteria and the one or more data criteria with the available vehicles in the fleet of vehicles.

In addition to one or more of the features described herein, the processor obtains a response from the vehicle requestor to the one or more suggested vehicles as feedback to the machine learning.

In addition to one or more of the features described herein, the processor combines the vehicle metrics from two or more of the one of the one or more suggested vehicles respectively suggested to two or more of the vehicle requestors.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
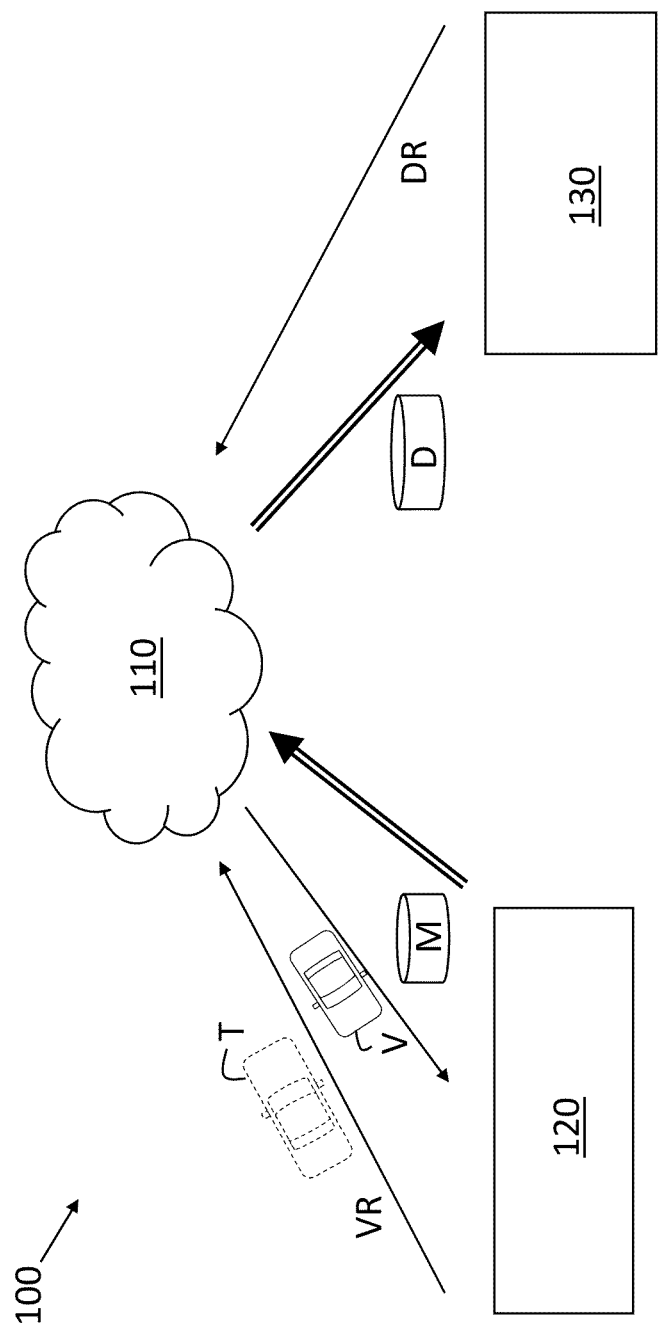
FIG. 1 is a block diagram of a system to integrate metric collection with vehicle request fulfillment according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a requestor may request a vehicle from a number of entities. For example, a requestor may request a vehicle from a company or dealership fleet or from a rental car company. As also noted, the vehicle provider or another entity (e.g., vehicle manufacturer, researcher) may be interested in obtaining metrics regarding a particular type of vehicle or a particular feature in some vehicles. Embodiments of the systems and methods detailed herein relate to the integration of metric collection with vehicle request fulfillment. The vehicle requestor may specify a type of vehicle (e.g., truck, sport utility vehicle (SUV), sedan, hybrid, electric, autonomous). The vehicle requestor may also indicate expected conditions of use for the vehicle (e.g., trip type, location of travel, time of travel, distance). The data requestor (e.g., developer, researcher, customer service analyst) may be interested in collecting metrics about a specific type of vehicle or a specific feature that is available in some of the vehicles of a fleet. According to one or more embodiments, a controller obtains the vehicle requestor and data requestor criteria and suggests a vehicle for use by the vehicle requestor that is more likely to result in metrics of interest for the data requestor.

In accordance with an exemplary embodiment, FIG. 1 is a block diagram of a system 100 to integrate metric collection with vehicle request fulfillment. A controller 110 communicates with a vehicle requestor 120 and a data requestor 130. In addition to wireless communication components, the controller 110 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The vehicle requestor 120 provides a vehicle request VR to the controller 110. As previously noted, the vehicle request VR may specify a type of vehicle V and criteria for use. For example, the vehicle requestor 120 may request a hybrid vehicle for use over a weekend for a 200 mile highway trip. As other examples, the vehicle requestor 120 may request an SUV for use in rugged terrain or may request a sedan for use in the evening during rush hour in an urban environment. According to an exemplary embodiment, the vehicle requestor 120 may already have another vehicle T to trade for the vehicle V being requested. The other vehicle T represents another factor for consideration by the controller 110 as discussed with reference to FIG. 2.

The data requestor 130 provides a data request DR to the controller 110. The data request DR may specify a particular feature about which the data requestor 130 seeks metrics. Exemplary features may specify a vehicle type (e.g., autonomous, SUV, hybrid) or particular functionality (e.g., hands-free driving). According to exemplary embodiments, the data request DR may also include particular driving conditions (e.g., time of day, geographic environment, temperature, road type) for which the metrics about the specified feature are requested. The metrics M from each vehicle V may include quality and usage metrics and may be obtained both automatically and manually, as further discussed with reference to FIG. 3. These metrics M from each vehicle V may be passed through as the data D or may be processed or combined to generate the data D that is provided to the data requestor 130 in response to the data request DR.

As further discussed with reference to FIG. 2, the controller 110 uses the data request DR to determine the specific vehicle V that is suggested or provided to the vehicle requestor 120 based on the vehicle request VR. That is, there may be multiple vehicles available in the fleet that meet the criteria specified in the vehicle request VR. The controller 110 determines if any of the available vehicles that meet the criteria of the vehicle request VR also meet the criteria of the data request DR. If so, the vehicle V provided to the vehicle requestor 120 will meet the criteria of the data request DR as well as the criteria of the vehicle request VR. Metrics M obtained based on the use of the vehicle V by the vehicle requestor 120 are then communicated from the vehicle requestor 120 to the controller 110. Some of the metrics M may be collected automatically while other metrics M involve manual input by the vehicle requestor 120, as further discussed with reference to FIG. 3. The controller 110 then provides data D to the data requestor 130. As previously noted, the data D may be the metrics M provided for a given vehicle V. Alternately, the data D may be a combination or processed version of the metrics M from one or more vehicles V.

Figure 2:
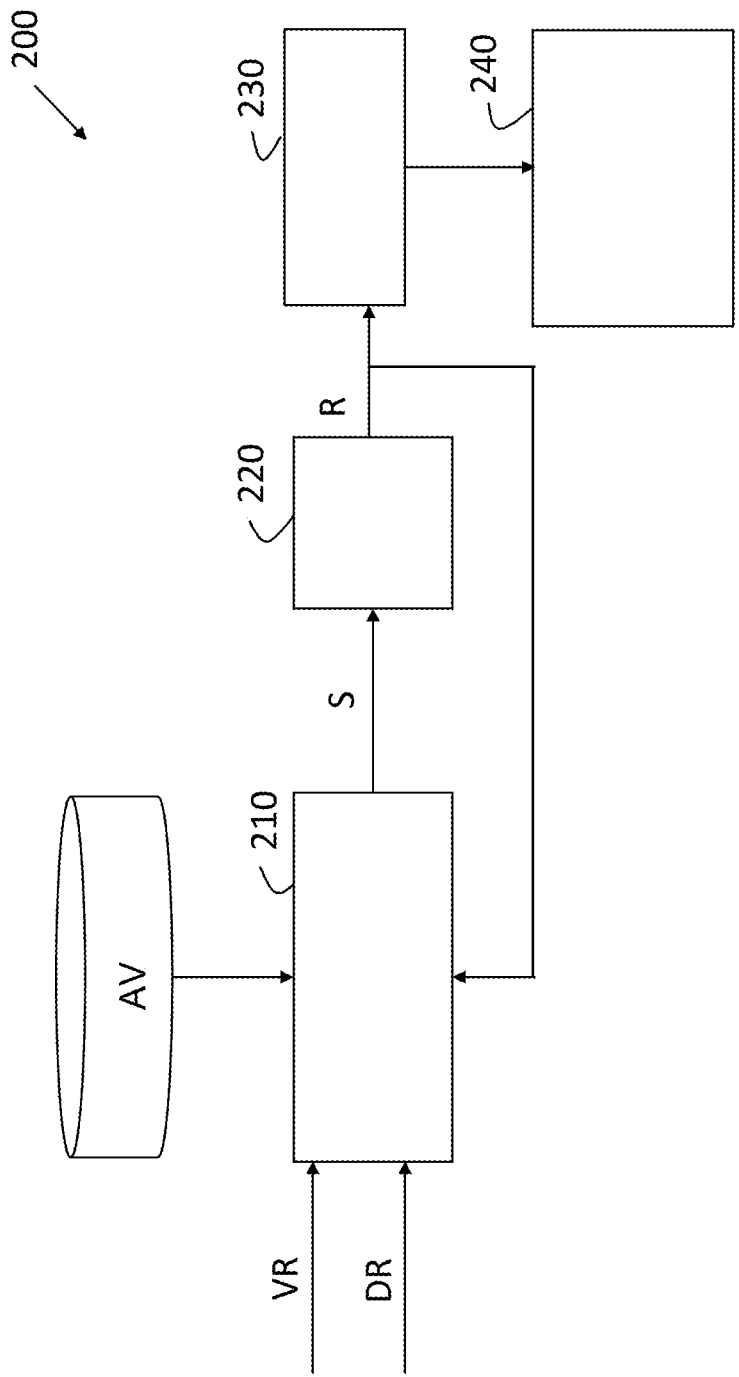
FIG. 2 is a process flow of a method of the controller integrating metric collection with vehicle request fulfillment according to one or more embodiments.

FIG. 2, with continuing reference to FIG. 1, is a process flow of a method 200 of the controller 110 integrating metric collection with vehicle request fulfillment according to one or more embodiments. As shown, the vehicle request VR from the vehicle requestor 120 and the data request DR from the data requestor 130 are both inputs to the controller 110. However, these two requests need not be temporally coordinated. For example, as discussed for explanatory purposes, a data request DR may be pending when a vehicle request VR is input. A database or other repository of available vehicles AV is also accessible by the controller 110. At block 210, the processes include matching and suggesting one or more vehicles S to the vehicle requestor 120.

The controller 110 may implement a machine learning algorithm to perform the matching. As previously noted, the vehicle request VR may specify a type of vehicle and other criteria. The vehicle request VR may also indicate a priority or weighting for specified criteria about the requested vehicle V. For example, an SUV may be a high priority criteria while a hybrid may be a lower priority criteria. As other examples, a particular feature (e.g., hands-free driving) may be a higher priority criteria than sedan. Similarly, the data request DR may also indicate priority or weighting for specified criteria about the requested data D. For example, while metrics about a particular feature may be the highest priority, the type of vehicle in which the feature is available may be a lower priority. As other examples, the geography in which the feature is used may be a lower priority criteria than the time of day. As a default, some (e.g., criteria with a weighting over a threshold value) or all criteria provided for the vehicle request VR may be prioritized over criteria provided for the data request DR.

With or without information indicating the priority or weighting of different criteria specified in the vehicle request VR and the data request DR, the controller 110 finds one or more suggested vehicles S from among the available vehicles AV to offer to the vehicle requestor 120. If the vehicle requestor 120 indicates possession of another vehicle T for trade, this other vehicle T is only considered an available vehicle AV when one of the available vehicles AV meets the criteria of the vehicle request VR by the vehicle requestor 120. That is, when multiple vehicle requests VRs from multiple vehicle requestors 120 are pending, then the order in which matches are made, at block 210, may consider whether another vehicle T is being offered by a given vehicle requestor 120. By processing the vehicle request VR that includes the other vehicle T as a trade first, the other vehicle T then gets added to the available vehicles AV for processing other pending requests.

Additionally, there need not be a one-to-one correspondence between a vehicle request VR and a data request DR. Instead, based on the matching by the machine learning, one or more suggested vehicles S may match the criteria for two or more data requests DRs. While a vehicle requestor 120 requests one vehicle V for use, a data requestor DR may and, likely, will want data D from many vehicles V. Thus, matching a vehicle request VR with as many data requests DR as possible facilitates obtaining more data D requested by more data requestors 130. A data requestor 130 may specify a number of the vehicles V from which metrics M should be obtained before data D is provided to the data requestor 130. Alternately or additionally, the data requestor 130 may specify a time period for collection of metrics M from vehicles V.

At block 220, receiving a response R from the vehicle requestor 120 refers to obtaining an indication of whether one of the suggested vehicles S is acceptable to the vehicle requestor 120 and, if so, which one is accepted as the vehicle V that the vehicle requestor 120 will use. This response R is used as feedback for further training the machine leaning algorithm, as indicated in FIG. 2, as well as for providing the vehicle V, at block 230. If one of the suggested vehicles S (at block 210) is not accepted, according to the response R (at block 220), then another iteration of matching and suggesting is performed at block 210. If one of the suggested vehicles S is accepted, then providing that vehicle V, at block 230, leads to obtaining metrics M and providing data D, at block 240. The metrics M obtained from the vehicle V and the data D provided to the data requestor 130 are further discussed with reference to FIG. 3.

Figure 3:
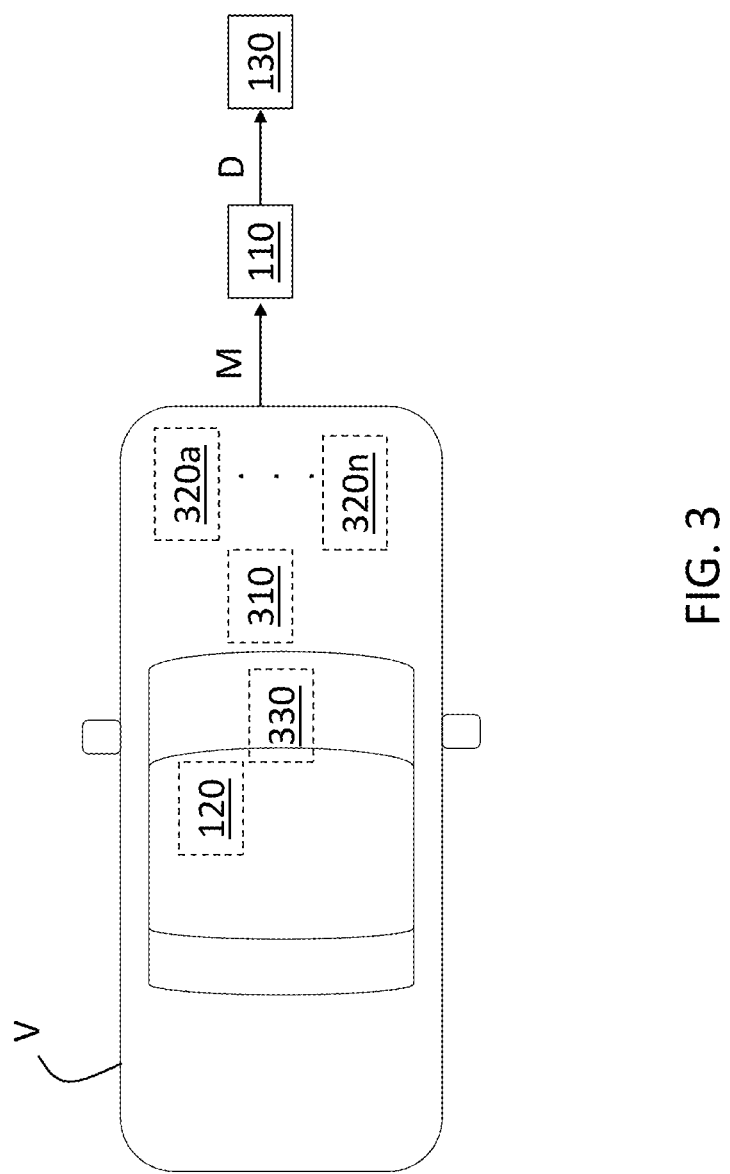
FIG. 3 is an exemplary vehicle provided based on a vehicle request that is integrated with a data request according to one or more embodiments.

FIG. 3 is an exemplary vehicle V provided based on a vehicle request VR that is integrated with a data request DR according to one or more embodiments. The exemplary vehicle V includes an exemplary feature (e.g., hands-free driving) implemented by a vehicle controller 310, one or more sensors 320a through 320n (generally referred to as 320), and an interface system 330 (e.g., infotainment system with display and user input). Exemplary sensors 320 include a radar system, a lidar system, and a camera. The data request DR may indicate an interest in metrics M from one of the sensors 320, a feature implemented by the vehicle controller 310, or a functionality of the infotainment system 310, for example. These exemplary systems are used for explanatory purposes and are not intended to limit the types of vehicle systems that may be the subject of the data request DR.

As previously noted, metrics M may be automatically logged regarding the specified feature, sensor 320, or other functionality of interest, as indicated in the data request DR. In addition, the driver or user of the vehicle, regarded as the vehicle requestor 120 for explanatory purposes, may provide manual metrics M via the infotainment system 310 or other user interface. The automatically and manually obtained metrics M are communicated to the controller 110, as shown. As previously noted, the metrics M may be combined with other metrics M from other vehicles V or otherwise processed to provide the data D to the data requestor 130.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of integrating metric collection with vehicle request fulfillment, the method comprising:

obtaining, at a controller, a vehicle request from a vehicle requestor, the vehicle request including one or more vehicle criteria;

obtaining, at the controller, a data request from a data requestor, the data request including one or more data criteria corresponding with vehicle metrics to be collected based on the vehicle requestor using a vehicle that provides the vehicle metrics corresponding with the one or more data criteria;

suggesting to the vehicle requestor, by the controller implementing a machine learning algorithm, one or more suggested vehicles from a fleet of vehicles based on their match with both the one or more vehicle criteria and the one or more data criteria;

obtaining a response from the vehicle requestor to the one or more suggested vehicles;

further training the machine learning algorithm by providing the response as feedback;

obtaining the vehicle metrics, at the controller, based on usage of one of the one or more suggested vehicles by the vehicle requestor; and providing to the data requestor, from the controller, the vehicle metrics.

2. The method according to claim 1, wherein the one or more vehicle criteria includes a type or feature.

3. The method according to claim 2, wherein the one or more vehicle criteria additionally includes a trip type or a time of day of travel.

4. The method according to claim 2, wherein the one or more vehicle criteria additionally includes a trade-in vehicle.

5. The method according to claim 1, wherein the one or more data criteria includes a vehicle feature.

6. The method according to claim 5, wherein the one or more data criteria additionally includes a trip type, a geography of travel, or a time of day of travel.

7. The method according to claim 1, wherein the vehicle metrics include automatically recorded metrics from the one of the one or more suggested vehicles and manually recorded metrics from the vehicle requestor.

8. The method according to claim 1, wherein the providing the vehicle metrics includes combining the vehicle metrics from two or more of the one of the one or more suggested vehicles respectively suggested to two or more of the vehicle requestors.

9. A system to integrate metric collection with vehicle request fulfillment, the system comprising:

a memory device configured to store a database of available vehicles; and a processor configured to obtain a vehicle request from a vehicle requestor, the vehicle request including one or more vehicle criteria, to obtain a data request from a data requestor, the data request including one or more data criteria corresponding with vehicle metrics to be collected based on the vehicle requestor using a vehicle that provides the vehicle metrics corresponding with the one or more data criteria, to implement a machine learning algorithm to suggest to the vehicle requestor one or more suggested vehicles from a fleet of vehicles based on their match with both the one or more vehicle criteria and the one or more data criteria, to obtain a response from the vehicle requestor to the one or more suggested vehicles, to further train the machine learning algorithm by providing the response as feedback, to obtain the vehicle metrics based on usage of one of the one or more suggested vehicles by the vehicle requestor, and to provide to the data requestor the vehicle metrics.

10. The system according to claim 9, wherein the one or more vehicle criteria includes a type or feature.

11. The system according to claim 10, wherein the one or more vehicle criteria additionally includes a trip type or a time of day of travel.

12. The system according to claim 10, wherein the one or more vehicle criteria additionally includes a trade-in vehicle.

13. The system according to claim 9, wherein the one or more data criteria includes a vehicle feature.

14. The system according to claim 13, wherein the one or more data criteria additionally includes a trip type, a geography of travel, or a time of day of travel.

15. The system according to claim 9, wherein the vehicle metrics include automatically recorded metrics from the one of the one or more suggested vehicles and manually recorded metrics from the vehicle requestor.

16. The system according to claim 9, wherein the processor combines the vehicle metrics from two or more of the one of the one or more suggested vehicles respectively suggested to two or more of the vehicle requestors.

* * * * *